Figure 1:
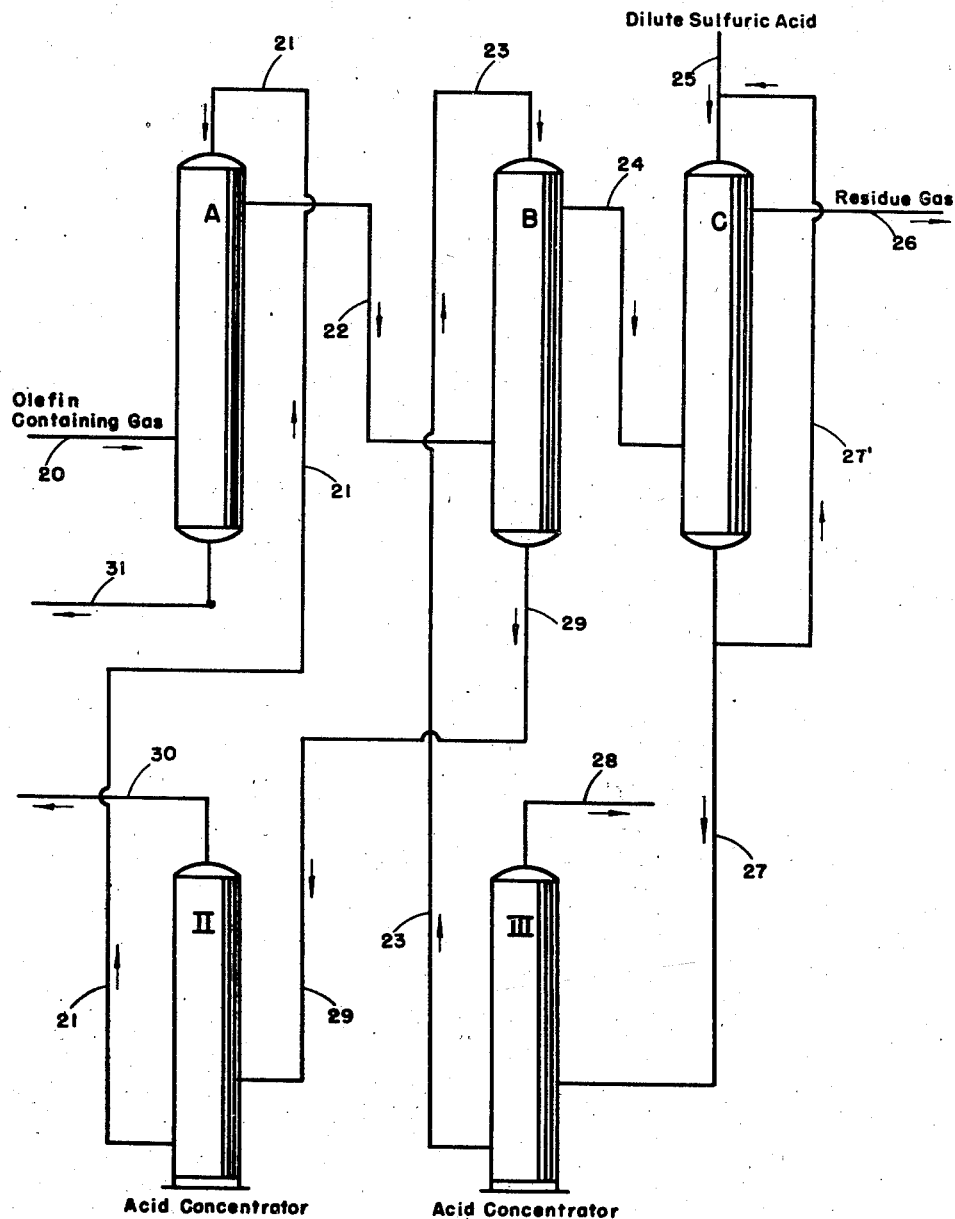

Patented Jan. 21, 1947

2,414,737

UNITED STATES PATENT OFFICE 2,414,737

ABSORPTION OF OLEFINS

Raymond L. Heinrich, Wooster, Tex., assignor to Standard Oil Development Company, a corporation of Delaware Application July 31, 1944, Serial No. 547,319

5 Claims. (Cl. 260—460)

The present invention is directed to a process for removing olefins from olefin-containing mixtures.

More specifically, the present invention is directed to a method for removing olefin from an olefin-containing mixture in stages, by contacting the mixture with sulfuric acid in each stage. It is a feature of the invention that acid containing absorbed olefin is withdrawn from one stage and water removed therefrom to increase the acid concentration therein, and this more concentrated acid then used as the absorbent in another stage.

The absorption of olefins by sulfuric acid is well known to the art. As one example, ethylene may be absorbed from a hydrocarbon mixture by the use of sulfuric acid to produce a mixture of ethyl sulfuric acid and diethyl sulfate. The ethyl sulfuric acid and di-ethyl sulfate may be hydrolyzed to form ethyl alcohol, or the di-ethyl sulfate may be used as an alkylating reagent in many organic reactions. As a general statement, it may be said that the sulfuric acid esters of ethylene may be the starting point for many organic syntheses. Propylene may be absorbed in sulfuric acid to form isopropyl sulfuric acid and the resulting isopropyl sulfuric acid may be hydrolyzed to form isopropyl alcohol or may be used as the alkylating agent in a number of alkylation reactions. It is also well known that other olefins, such as pentenes and butenes, are absorbed in sulfuric acid to form alkyl sulfuric acids, and the resulting acids may be hydrolyzed to form alcohol or may be used as the alkylating agent in alkylation reactions.

In processes involving the absorption of olefin by sulfuric acid, the amount of olefin absorbed per mole of $H_2SO_4$ often determines to a large degree the efficiency of the entire process. This is particularly true in processes for preparing alcohols from olefins. When producing alcohol by this method the olefin is absorbed in sulfuric acid and the resulting alkyl sulfuric acid is then hydrolyzed. Upon hydrolysis, diluted sulfuric acid and alcohol is obtained, and in order to recycle the resulting acid to the process as the absorption agent it is essential that it be reconcentrated. In accordance with the present invention, at least a part of the reconcentration procedure is integrated with the absorption of the olefin in order to obtain a more efficient process.

The present invention will be found particularly useful in the separation of ethylene from gaseous mixtures. In the manufacture of ethyl alcohol from ethylene, it is desirable to use acid having a concentration of 98 weight per cent $H_2SO_4$ in order that the maximum amount of ethylene be absorbed per mole of $H_2SO_4$. The sulfuric acid containing the absorbed ethylene is then diluted with water and hydrolyzed to form ethyl alcohol and dilute sulfuric acid. After the removal of the ethyl alcohol, the acid must then be reconcentrated before it is suitable for return to the absorption step. It is a characteristic of sulfuric acid that it may be concentrated to approximately 87 weight per cent of $H_2SO_4$ with little difficulty, but any greater concentration is so difficult that it is usually desirable to add $SO_3$ to the acid of this concentration in order to produce sulfuric acid of 98 weight per cent concentration. It will be apparent that such an operation results in a continued surplus of weak sulfuric acid and requires the use of substantial quantities of $SO_3$.

In the absorption of ethylene by the use of sulfuric acid in accordance with the present invention, it is unnecessary to employ sulfuric acid of a concentration greater than 85 weight per cent $H_2SO_4$ as the absorption agent. This is possible by using the 85 weight per cent $H_2SO_4$ as the absorption agent in one stage, removing the resultant rich acid from this stage, evaporating water therefrom to increase the concentration of the acid and then employing the resulting acid as the absorption agent in another stage. The number of stages used for the absorption of the olefin may, of course, be varied, as desired. In this procedure the contacting of the sulfuric acid with ethylene in the first stage causes the formation of relatively inert sulfates, which in turn reduces the $H_2SO_4$ to $H_2O$ ratio and allows the separation of additional water by simple distillation.

Figure 2:
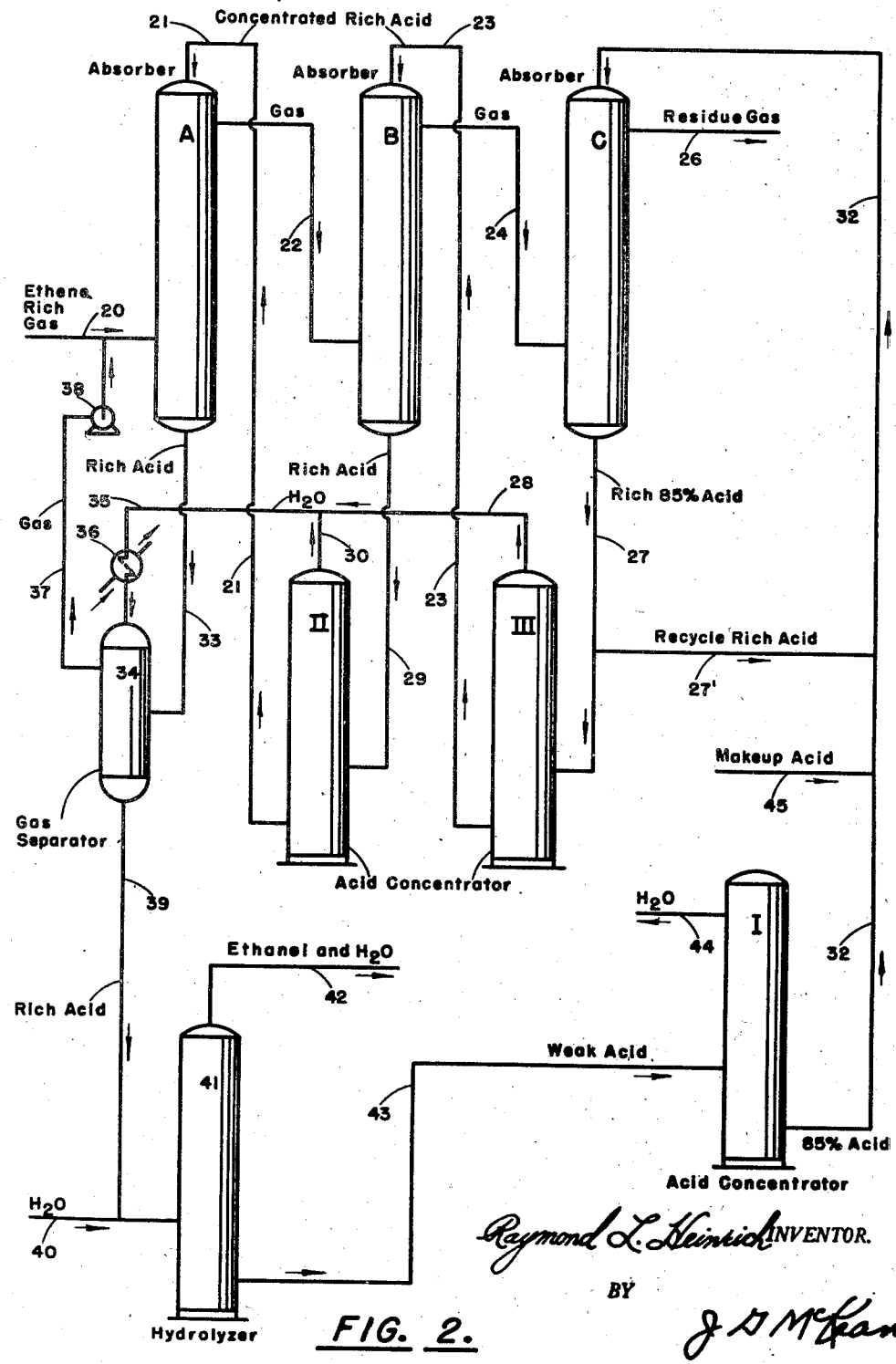

The invention will now be described in further detail by reference to the accompanying drawings, in which:

Fig. 1 is in the form of a diagrammatic flow sheet showing the absorption of olefin from olefin-containing gas in stages, with the concentration of the sulfuric acid used as the absorbent between the stages; and Fig. 2 is in the form of a diagrammatic flow sheet showing in detail the absorption of ethylene from a gaseous mixture in stages, with reconcentration of the sulfuric acid employed as the absorbent between stages, the hydrolysis of the rich sulfuric acid to form ethyl alcohol and the recycling of the weak acid recovered from the hydrolysis step to the absorption stages.

Referring now specifically to Fig. 1, the vessels designated A, B and C serve as absorption stages, and the vessels II and III serve as concentrating stages intermediate the absorption stages. The olefin-containing gas employed as a feed for the process is discharged via inlet 20 into a lower portion of absorption vessel A and rises upwardly therein countercurrent to a stream comprising sulfuric acid and ethyl sulfuric acids, which is discharged into the upper portion of vessel A via line 21. It will be understood that vessels A, B and C may be any well known type of vessel employed for absorption operations and may include packed towers or bubble towers, as desired. The gaseous stream from the top of vessel A is withdrawn via line 22 and discharged into the lower portion of absorption vessel B, where it rises countercurrent to a stream comprising sulfuric acid and ethyl sulfuric acid which is discharged into the upper end of vessel B via line 23. The gaseous stream from the upper portion of vessel B is withdrawn through line 24 and sent to absorption vessel C, where it rises upwardly countercurrent to a stream of dilute sulfuric acid discharged by line 25 into the upper end of vessel C. The residue gases are removed from the upper part of absorption vessel C through outlet 26 and are withdrawn from the system.

The sulfuric acid employed as an absorbent in vessel B has a lower water content than that used in absorber C, and the sulfuric acid employed in absorber A has a lower water content than that in absorber B. The decrease in water content of the sulfuric acid as it progresses through the system is obtained as follows. The dilute sulfuric acid discharged into the upper portion of vessel C travels downwardly countercurrent to the upwardly rising stream of gases containing olefins which have not been removed in the two preceding stages and the major portion of these olefins is absorbed by the dilute sulfuric acid so that the liquid accumulating in the bottom of vessel C comprises alkyl sulfates, $H_2SO_4$ and $H_2O$. The $H_2SO_4:H_2O$ ratio of the liquid in the bottom of vessel C is smaller than the $H_2SO_4:H_2O$ ratio of the sulfuric acid discharged into the upper end of the vessel because a portion of the $H_2SO_4$ has been converted to alkyl sulfates. Rich acid is removed from absorption tower C via line 27 and the stream split, with a portion being discharged into acid concentrator III and the remainder recycled via line 27' and admixed with the lean absorption acid being passed to absorption vessel C. The operating conditions of the acid concentrator are regulated to prevent the destruction of the alkyl sulfates and to cause the removal of a portion of $H_2O$ in vapor form. The $H_2O$ vapors are removed as overhead from concentrator III by means of line 28, and the concentrated rich sulfuric acid is removed from the lower portion of acid concentrator III by line 23 and discharged into the upper portion of absorption vessel B. In absorption vessel B the acid is contacted with additional olefins with the resultant formation of additional alkyl sulfates in the absorbent acid. As a result, the liquid accumulating in the bottom of vessel B has an $H_2SO_4:H_2O$ ratio lower than the $H_2SO_4:H_2O$ ratio of the liquid discharged into the upper portion of the vessel. The rich sulfuric acid from vessel B is withdrawn via line 29 into acid concentrator II, which is operated under conditions similar to acid concentrator III to cause the removal of $H_2O$ in the vaporous form from the rich sulfuric acid without the destruction of appreciable amounts of the ethyl sulfates present therein. The water vapor is removed from concentrator II via line 30. The concentrated rich acid is withdrawn from concentrator II via line 21 and is discharged into the upper portion of absorber A. The absorbent medium in vessel A comes in contact with the olefin-containing gases employed as feed for the process and absorbs a portion of the olefins from these gases to form additional alkyl sulfates in the absorbent liquid. The rich absorbent liquid accumulating in the bottom of vessel A may be withdrawn from the system via outlet 31. This rich absorbent medium is suitable as a feed for a hydrolysis step to form alcohols from the rich absorbent medium, or it may be employed for other purposes, such as the alkylating agent in an alkylation reaction.

It is to be understood that the temperatures, pressures and concentrations of the reactants employed in the processing may be varied in accordance with the composition of the feed stock. When ethylene is being absorbed from an olefin-containing gas, it is desirable to operate the absorption towers at a temperature of the order of 150° F. When olefins of greater molecular weight are absorbed, it is usually desirable to use lower temperatures in order to reduce the tendency of the higher olefins to polymerize.

Fig. 2 shows the preferred embodiment of the present invention wherein ethylene-containing gases are sent to a plurality of absorption steps, with the sulfuric acid employed as the absorption material concentrated between the absorption steps. The rich sulfuric acid recovered from the absorption portion of the procedure is then hydrolyzed to form ethyl alcohol and weak acid, and the weak acid is concentrated and returned to the absorption portion of the process.

Fig. 2 is provided with three absorption vessels, corresponding to the three absorption vessels of Fig. 1, and designated A, B and C, as are the corresponding vessels of Fig. 1. Two acid concentrators are provided between the absorption steps of Fig. 2, and these concentrators are designated II and III, as are the corresponding concentrators of Fig. 1. A third acid concentrator is shown in Fig. 2 for concentrating acid being recycled to the absorption portion of the process and is designated by I.

The absorption portion of the process of Fig. 2 corresponds to that of Fig. 1. In Fig. 2 ethylene-rich feed gas is passed via inlet 20 into the lower end of absorption tower A, rises upwardly in absorption tower A, is withdrawn through line 22 to absorption tower B, rises upwardly in absorption tower B, is withdrawn from the upper portion of absorption tower B through line 24 to absorption tower C, rises upwardly in absorption tower C and is withdrawn as residue gas via line 26. The flow of absorption acid through vessels A, B and C in Fig. 2 is similar to the flow of acid through these vessels in Fig. 1. Eighty-five weight per cent sulfuric acid flows from line 32 into the upper portion of absorption vessel C, rich acid from the lower portion of vessel C is withdrawn through line 27 and the stream split, with a portion going to acid concentrator III and a portion being recycled to vessel C by lines 27' and 32. Rich concentrated acid passes from vessel III via line 23 to the upper portion of vessel B. The rich acid from the lower portion of vessel B is withdrawn via line 29 to acid concentrator II, and the concentrated rich acid is withdrawn from vessel II through line 21 into absorption vessel A. Water in vaporous form is withdrawn from the upper portion of acid concentrator III through line 28 and from the upper portion of acid concentrator II through line 30.

The rich acid accumulating in the bottom of tower A is usually under a substantial pressure, and it is desirable to reduce said pressure in a preliminary gas separation stage before subjecting the material to hydrolysis. The rich acid from absorption tower A may be withdrawn through line 33 to a gas separator 34. It is also desirable to pass the vapors removed from acid concentrators II and III through a condenser and into a gas separator in order to recover any olefins which may be removed along with the water vapors from the concentrators. To this end the mixture of vapors from lines 28 and 30 may be combined in a line 35, containing cooler 36, and discharged into gas separator 34. The gases separated from the liquids in vessel 34 may be withdrawn through line 37, compressed in compressor 38 and subsequently added to the ethylene-rich feed stock in line 20. The addition of the condensed water to the rich acid in separator 34 will reduce the concentration of the acid somewhat, but additional amounts of water must be added to the acid in order to hydrolyze the composition. The rich acid is withdrawn from gas separator 34 through outlet 39 and additional water is added thereto through line 40, and the diluted mixture is discharged into hydrolyzer 41. The step of hydrolyzing the rich acid is well known to the art, and accordingly this step will not be described in detail. It is sufficient to state that a mixture of ethyl alcohol and water is withdrawn in vaporous form through line 42 and sent to concentrating means, not shown, in order to concentrate the ethyl alcohol as desired. Dilute sulfuric acid may be withdrawn from hydrolyzer 41 by means of line 43 to acid concentrator I, where $H_2O$ is removed from the acid in order to obtain an acid of suitable concentration for use in absorption tower C. The acid from concentrator I is withdrawn through line 32 and discharged into the upper portion of vessel C. The $H_2O$ removed from the acid in concentrator I is discharged via outlet 44. In a continuous process, a portion of the acid will unavoidably be lost in the system, and in order to maintain a constant amount of acid in the system, make-up acid may be added to line 32 through inlet 45 either continuously or intermittently.

It will be found desirable to conduct the absorption of ethylene in vessels A, B and C under a pressure ranging from 300 to 500 pounds per square inch and at a temperature in the range of 100° to 200° F. The acid recovered from acid concentrator I will preferably have a concentration of approximately 85 weight per cent acid. The acid concentrators I, II and III may be operated under atmospheric or less than atmospheric pressures and at temperatures in the range of 100° to 250° F.

The following example illustrates the practice of the present invention when using three absorption stages, operating at a temperature of 150° F. and a pressure of 400 pounds per square inch and employing 87 weight per cent $H_2SO_4$ as the absorption medium in stage C. If gas containing 2 moles of ethylene is discharged into vessel A, the residue gas removed from this vessel contains 1.5 moles of ethylene, which is used as feed for vessel B. The gas discharged from vessel B contains .9 mole of ethylene, which is used as the feed for vessel C and the residue gas removed from vessel C contains .2 mole of ethylene. The absorption liquid in vessel C has a concentration of 87 weight per cent sulfuric acid. If the sulfuric acid used consists of 1 mole $H_2SO_4$ and .8 mole water, the rich sulfuric acid withdrawn from vessel C includes .8 mole $H_2O$, 1 mole $H_2SO_4$ and .7 mole ethylene. The rich acid is sent to acid concentrator III and here .4 mole of water is removed to produce a concentrated acid including .4 mole $H_2O$, 1 mole $H_2SO_4$, .7 mole ethylene, and equivalent to 93 weight per cent acid. This acid is used as the absorbent medium in vessel B and removes therefrom .6 additional mole of ethylene, so that the rich material withdrawn from the bottom of vessel B includes .4 mole $H_2O$, 1 mole $H_2SO_4$ and 1.3 moles ethylene, which is sent to acid concentrator II where .2 mole $H_2O$ is separated therefrom. The concentrated acid removed from vessel II includes .2 mole $H_2O$, 1 mole $H_2SO_4$, 1.3 moles ethylene, and is equivalent to 97 weight per cent sulfuric acid and is used as the absorption medium in vessel A. The rich absorption liquid from vessel A includes .2 mole water, 1 mole $H_2SO_4$ and 1.8 moles ethylene. This product from absorber A has added thereto the .6 mole of water removed in concentrators II and III, and in addition 10 moles of water, to make a total of 10.8 moles of water in the hydrolyzer. From the hydrolyzer 1.8 moles of ethyl alcohol and 4 moles of water are removed as overhead, while the acid discharged therefrom contains 1 mole $H_2SO_4$ and 5 moles $H_2O$ and corresponds to a concentration of 52% $H_2SO_4$. This weak acid is then sent to acid concentrator I, where 4.2 moles of water are evaporated to recover acid containing .8 mole $H_2O$ and 1 mole $H_2SO_4$, which corresponds to 87% $H_2SO_4$, and is recycled as the absorbent liquid in absorption vessel C.

Having fully described the present invention, what I desire to claim is:

1. A method for recovering olefins from an olefin-containing feed stock comprising the steps of passing the feed stock in sequence through a first and a second absorption zone, contacting the feed stock in the second absorption zone with an absorption liquid comprising $H_2SO_4$ and $H_2O$ under conditions to absorb olefin in the absorption liquid, removing rich absorption liquid from the second absorption zone, removing at least a portion of the $H_2O$ therefrom to produce a concentrated rich absorption medium and employing at least a portion of the resulting concentrated rich absorption medium as the absorbent liquid in the first absorption zone.

2. A method for removing olefins from an olefin-containing feed stock comprising the steps of contacting the feed stock in a first absorption zone with an absorption liquid comprising $H_2SO_4$, $H_2O$ and absorbed olefins under conditions to absorb olefins from the feed stock into the absorption liquid, removing absorption liquid from the first absorption zone, passing the feed stock from the first absorption zone to a second absorption zone and contacting it therein with a feed stock comprising $H_2SO_4$ and $H_2O$ under conditions to absorb olefin therefrom, removing the rich absorption liquid from the second absorption zone, subjecting it to a concentrating step to remove a portion of the $H_2O$ therefrom, removing at least a portion of the resulting concentrated rich absorbent from the second absorption zone and employing it as the absorption liquid in the first absorption zone.

3. A method for removing olefins from an olefin-containing feed stock comprising the steps of passing the feed stock as a stream in sequence through a first absorption zone, and a second absorption zone, contacting the stream in the second absorption zone with an absorption liquid comprising $H_2O$ and $H_2SO_4$ and maintaining the second absorption zone under conditions to cause the removal of olefins from the feed stream by the absorption liquid to form rich absorption liquid, removing rich absorption liquid from the second absorption zone, removing a portion of the $H_2O$ from the rich absorption liquid to increase the ratio of $H_2SO_4$ to $H_2O$ and employing at least a portion of the resulting rich absorption liquid as the absorbent in the first absorption zone under conditions to cause the removal of olefin from the feed stream in the first absorption zone and enrich the absorption liquid and removing enriched absorption liquid from the first absorption zone.

4. A method for removing ethylene from an ethylene-containing feed stock comprising the steps of passing the feed stock as a stream in sequence through a first absorption zone and a second absorption zone, employing as an absorption liquid in the second absorption zone an absorbent liquid comprising $H_2SO_4$ and $H_2O$ under conditions to cause the absorption of ethylene in the absorption oil and produce a rich absorption liquid, removing rich absorption liquid from the second absorption zone, separating a portion of the $H_2O$ therefrom to increase the $H_2SO_4$ to $H_2O$ ratio therein to form a concentrated rich absorption liquid, subsequently employing said concentrated rich absorption liquid as the absorbent liquid in the first absorption zone under conditions to cause the absorption of olefins therein to produce an enriched absorption liquid, removing the enriched absorption liquid from the first absorption zone and hydrolyzing to form ethyl alcohol and dilute sulfuric acid, removing a portion of the water from the dilute sulfuric acid and employing it as the absorption liquid in the second absorption zone.

5. A method for treating hydrocarbons comprising the steps of passing a feed stock comprising ethylene as a stream in sequence through a first, second and third absorption zone, contacting the stream in the third absorption zone with sulfuric acid of a concentration of 85 weight per cent and at a temperature in the range of 150° to 200° F. and at a pressure in the range of 300 to 500 pounds per square inch, removing rich absorption acid from the third absorption stage to a first acid concentrator where a portion of the $H_2O$ is removed from the rich acid, removing the resulting absorption acid from the first acid concentrator and passing it to the second absorption step as the absorption acid therein, maintaining the second absorption step at a temperature in the range of 150° to 200° F. and at a pressure in the range of 300 to 500 pounds per square inch, removing rich absorption acid from the second absorption step, passing it to a second acid concentrator wherein a portion of the $H_2O$ is removed therefrom, removing resulting absorption acid from the second concentrator to the first absorption step, maintaining the first absorption step at a temperature in the range of 150° to 200° F. and at a pressure in the range of 300 to 500 pounds per square inch, removing rich absorption acid from the first absorption step and hydrolyzing to form ethyl alcohol and weak sulfuric acid, removing the ethyl alcohol as product, concentrating the weak sulfuric acid in a third acid concentrator and removing acid from the third acid concentrator and passing it into the third absorption stage as absorption acid.

RAYMOND L. HEINRICH.